United States Patent [15] 3,684,950
Nilsson [45] Aug. 15, 1972

[54] LEAD STORAGE BATTERY CELL ELECTROLYTE DENSITY MEASURING DEVICE AND METHOD

[72] Inventor: Ove K-G Nilsson, Nol, Sweden

[73] Assignee: Aktiebolaget Tudor, Stockholm, Sweden

[22] Filed: Feb. 8, 1971

[21] Appl. No.: 113,361

[52] U.S. Cl. ................................324/29.5, 136/182
[51] Int. Cl. ...........................................G01n 27/42
[58] Field of Search ................324/29.5, 29; 136/182

[56] References Cited

UNITED STATES PATENTS 2,328,853  9/1943  Sherrard....................324/29.5
3,083,253  3/1963  Sundberg....................136/160

Primary Examiner—Alfred E. Smith
Attorney—Burns, Doane, Swecker & Mathis

[57] ABSTRACT

The measurement of the charge in a lead-acid storage battery through the determination of the density of the sulfuric acid electrolyte by making two conductivity measurements of the electrolyte with the second measurement being made after a dilution or concentration of the sulfuric acid to thereby resolve an ambiguity in the conductivity-density relationship.

10 Claims, 4 Drawing Figures

PATENTED AUG 15 1972　　　　　　　　　　　　　　　3,684,950
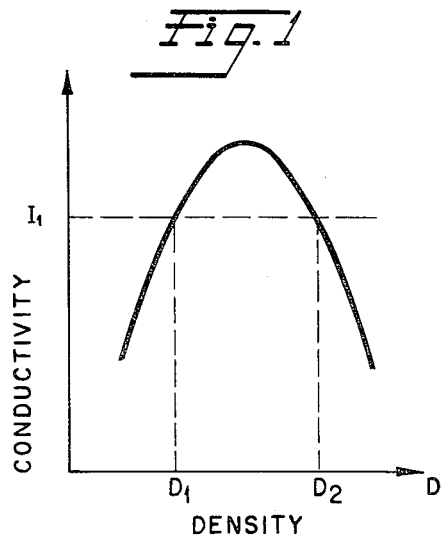
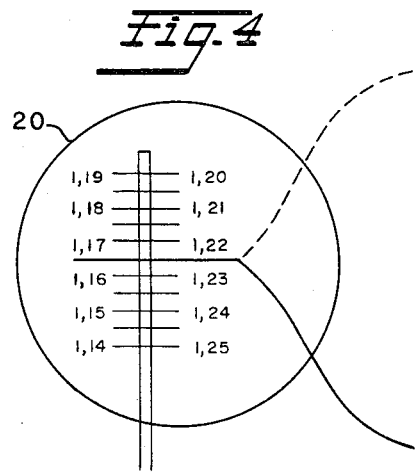
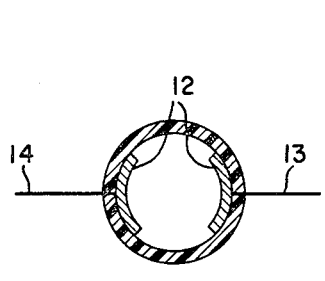
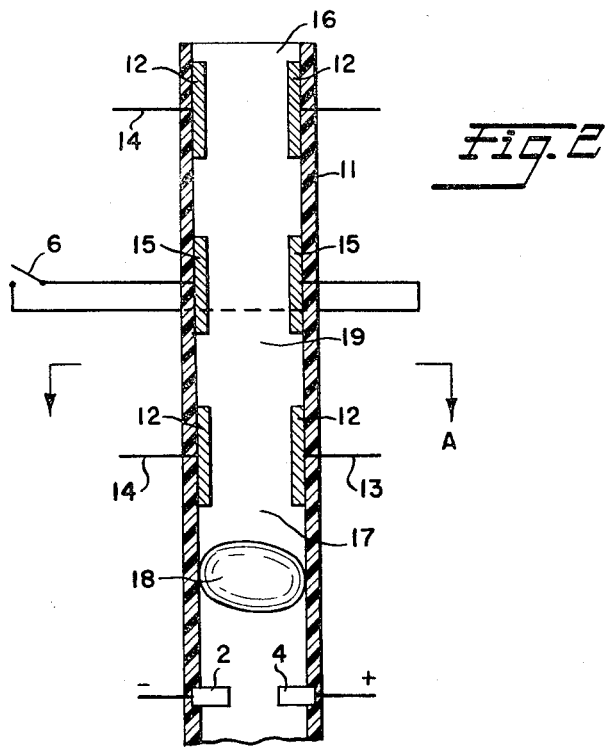
INVENTOR
OVE K-G NILSSON
*Burns Doane Swecker & Mathis*
ATTORNEYS

LEAD STORAGE BATTERY CELL ELECTROLYTE DENSITY MEASURING DEVICE AND METHOD

The present invention relates to a device for the measurement of the charge or density of the electrolyte in a lead storage cell, whereby the result of the measurement is obtained electrically, which may, if desired, be displayed remotely.

The device consists of one or two electrolyte conductivity sensors disposed in a tube of insulating material which, in turn, is disposed in the electrolyte of the cell. In a preferred embodiment, the tube contains a special lead cell for diluting a small amount of electrolyte by discharge in the said cell. By this arrangement, readings of the electrolyte density and hence the charge in the cell may be continuously monitored.

In the device of the present invention, there is additionally a pump or an electrolyzer for generation of air or gas bubbles which are caused to rise a certain distance in the tube and thereby develop a pumping action. The pump devices of the type involved here may be of a known type, such as are described in U.S. Pat. No. 3,083,253, and the device of the invention can advantageously be combined with the devices described therein.

It is an object of the present invention to provide a novel device and method for the determination and display of the charge in a lead storage battery by the determination of the density of the sulfuric acid electrolyte through the measurement of the conductivity of the electrolyte.

Another object is to provide a novel method and apparatus for the determination of which of two electrolyte densities which correspond to the same electrical conductivity measurement is the correct density by use of a simple and practical device which can be inserted in a storage battery and used to provide a remote indication of the state of the charge of the cell.

These and other objects will become more fully apparent from the claims, and from the specification as it proceeds in connection with the accompanying drawings wherein:

FIG. 1 is a diagram showing the relationship between density D and conductivity I;

FIG. 2 is a side elevation in section showing a device capable of operating in accordance with the present invention;

FIG. 3 is a cross section through the device of FIG. 2, along line A—A; and

FIG. 4 illustrates a recording instrument, e.g., an oscilloscope or other indicating instrument.

The density of the battery electrolyte, in the present case dilute sulfuric acid, ranges between about 1,000 g/dm$^3$ and 1,300 g/dm$^3$. In this range of concentration, the conductivity of the sulfuric acid passes through a maximum, as shown in FIG. 1, and it is thus not possible to determine the density with a single conductivity measurement.

Referring now to FIGS. 2 and 3 of the drawings, a tube 11 of insulating acid resistant material is provided which has a sufficiently small diameter so that it can be inserted in a battery cell without difficulty. Such tubes are known and are shown as being used as electrolyte pumps in U.S. Pat. No. 3,083,253. Such tubes have a special shape and/or electrode arrangement, such as electrodes 2 and 4 of FIG. 2, which are connected to a suitable source of voltage to cause bubbles 18 to be formed. Alternatively, bubbles of air can be directly introduced to the bottom of tube 11, as disclosed in said patent. In any case, bubbles 18 can be made to rise through the vertically oriented tube 11 at arbitrarily selectable distances and at a suitable speed, and thus in effect produce a sort of pumping of the electrolyte, all as described in the above patent.

In accordance with the present invention, electrical conductivity measurements of the electrolyte layers between adjacent bubbles are made to produce an indication of the density of the electrolyte. To make the conductivity measurements, a pair of electrodes 12 are mounted along the inside wall of tube 11 and are provided with leads 13 and 14, as shown in FIGS. 2 and 3. The voltage drop between electrodes 12 can be measured by a suitable recording instrument having a scale calibrated as shown, for example, in FIG. 4.

The reading illustrated in FIG. 4 is either 1.165 or 1.225. This corresponds to points $D_1$ or $D_2$ on the conductivity v. density curve of FIG. 1. To determine which density reading is correct, it is necessary to vary the density in a known manner and again measure the conductivity.

The density may be varied, for example, by introducing a small quantity of water. If the conductivity increases so that the indicator in FIG. 4 rises, then it is evident that the higher number 1.225 or $D_2$ in FIG. 1 is the correct value. On the other hand, if the conductivity decreases, then the lower number 1.165 or $D_1$ in FIG. 1 is the correct value.

Since it is not always convenient or practical to add water to tube 11 before making the second reading, the present invention contemplates, in some embodiments, the provision of a discharge cell 19 comprising the usual lead battery electrodes 15. In this fashion, a second measurement can be taken after the acid concentration has been reduced by the discharge cell 19. The second measurement may be readily obtained by measuring the electrodes 12 provided at the top of tube 11, as illustrated in FIG. 2. Both pairs of electrodes 12 are identical.

The second measurement that is provided by the upper pair of electrodes also gives the information necessary to determine on which branch of the curve of FIG. 1 the first reading lies.

Instead of cell 19 being a discharge region, cell 19 may be made a charging cell without any change to the structure of tube 11 and its electrodes.

It is also possible to delete the lower pair of electrodes 12 and make two readings of the conductivity of the electrolyte by only the upper pair of electrodes 12. In this embodiment, switch 6 is left open for making a reading of the conductivity of the normal electrolyte. Then switch 6 is closed to thus change the density of the electrolyte due to the discharging, or charging, action of cell 19. As soon as the conductivity reading on indicator 4 starts to change, one immediately knows which branch of the curve of FIG. 1 represents the correct density of the electrolyte.

In the preferred embodiment as illustrated in FIG. 2, the measurement occurs in the following way. The conductivity is measured at the lower measuring point, and at the same time discharge cell 19 is started and allowed to function continuously, whereby the concentration of acid is continually reduced. The acid is moved to measuring region 16 by means of gas bubble 18. The speed of the measurement of the bubble and distance between the successive gas bubbles is selected so that changes in conductivity I can be followed as a function of time.

In the embodiment where the lower electrodes 12 are omitted, only one measuring region 16 above discharge cell 19 is used, and two measurements spaced at an interval in time are necessary. One measurement is made of the electrolyte conductivity with the cell 19 being disconnected, and the second measurement is made after the cell has changed the density of a portion of the electrolyte and that portion has moved between the upper electrodes at region 16.

To obtain a value of the density of the acid that corresponds to the measured conductivity, a certain amount of acid is caused to reduce its concentration in the region of discharge cell 19, and after a second measurement of conductivity, it is possible to determine on which branch of the curve of FIG. 1 the point in question lies. If a higher value of conductivity is obtained in the second measurement, it corresponds to $D_2$ on the density axis in the same figure, and if the second measured value is lower, it corresponds to a density value of $D_1$.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. Apparatus for determining the charge in a cell of a lead-acid storage battery having a sulfuric acid electrolyte comprising a tube of electrolyte resistant insulating material disposed substantially vertically in the cell and submerged in said electolyte; means for generating gas bubbles which fill the cross section of said tube and rise to the top of said tube at a controlled rate and at arbitrarily selectable intervals of time; a pair of opposed electrodes on opposite sides of said tube above the bubble generating means; and circuit connections between said pair of opposed electrodes and means for producing an indication of the conductivity of said electrolyte.

2. Apparatus as defined in claim 1 together with means for varying in a known direction the density of a portion of the electrolyte passing between said pair of opposed electrodes and for producing an indication of the conductivity of said portion of the electrolyte.

3. Apparatus as defined in claim 2 wherein the density varying means comprises a battery cell having electrodes on opposed sides of the inner surface of said tube, said cell electrodes being located below said pair of opposed electrodes but above said gas bubble generating means.

4. Apparatus as defined in claim 3 wherein said cell is disconnected for a portion of each measuring cycle and is selectively connected to cause the density of the electrolyte in the region of the cell to be altered in a known direction.

5. Apparatus as defined in claim 3 further comprising another pair of opposed electrodes on opposite sides of said tube above the bubble generating means and below said cell, and said cell is continuously connected during each measuring cycle whereby the conductivity of a portion of the electrolyte at said other pairs of electrodes is first measured, the density of said electrolyte portion altered in a known direction as said portion rises past said cell electrodes, and the conductivity of said portion whose density has been altered is measured to produce a determinable measurement of the density of the battery electrolyte.

6. Apparatus for use with a lead-storage battery in making a determination of the density of sulfuric acid electrolyte within said battery comprising: a tube of electrolyte resistant insulating material adapted to be disposed substantially vertically in a cell of the battery; means for producing gas bubbles that fill the inside diameter of said tube at arbitrarily selectable intervals of time and rise to pass through said tube; means on said tube for providing a measurement of the conductivity of the electrolyte passing through said tube between successive gas bubbles; a pair of elements constituting a battery cell for selectively altering the density of said electrolyte on said tubing a position below said measurement means, and means for connecting said measurement means to a remote measuring instrument.

7. Apparatus as defined in claim 6 having a second means on said tube for providing a measurement of the conductivity of the electrolyte passing through said tube, said second measurement means being disposed below said battery cell elements.

8. A method for producing a measurement of the density of the electrolyte in a lead-acid storage battery comprising providing a tube which is disposed in a substantially vertical position submerged in the electrolyte of a cell of said battery; generating bubbles of gas which fill the cross section of said tube and rise through said tube at arbitrarily selectable intervals of time; measuring the conductivity of the electrolyte as it passes through an upper region of said tube; thereafter altering the density of a portion of said electrolyte in said tube in a known direction and again measuring the conductivity of said altered portion as it passes through said tube to thereby provide a determination of the electrolyte density.

9. The method as defined in claim 8 wherein the step of altering the density of a portion of said electrolyte comprises passing the electrolyte through a region of said tube containing electrodes producing the charging or discharging action of a battery cell on the electrolyte passing through said tube.

10. The method as defined in claim 9 wherein a first conductivity measurement is made in the tube at a region below said density altering region and a second conductivity measurement is made in the tube at a region above said density altering region.

* * * * *